J. KLEMOVICS.
ELECTRIC TRAP.
APPLICATION FILED MAR. 30, 1911.
1,017,875.
Patented Feb. 20, 1912.
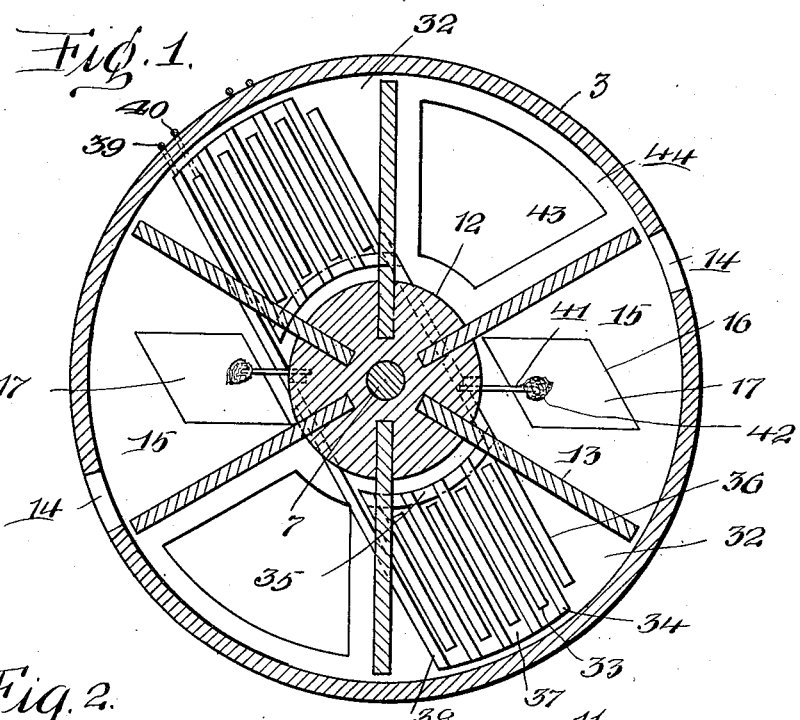
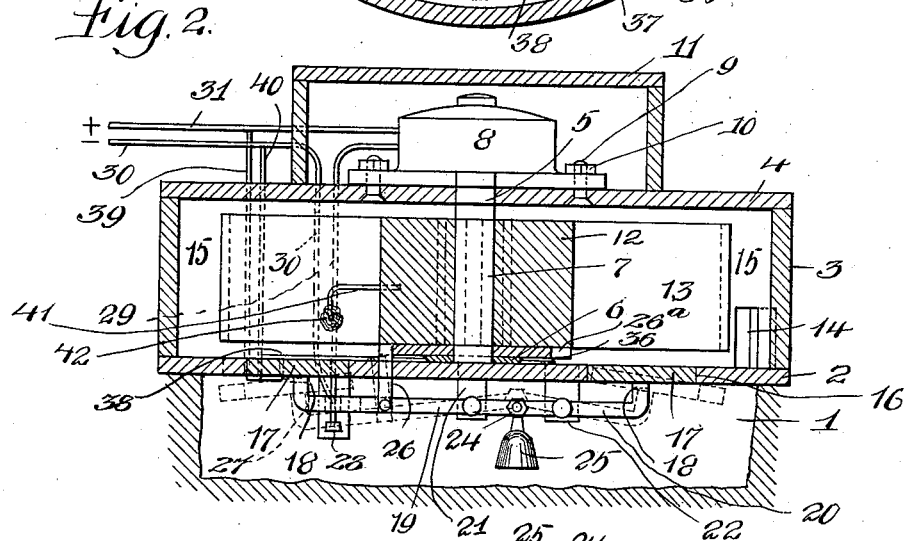
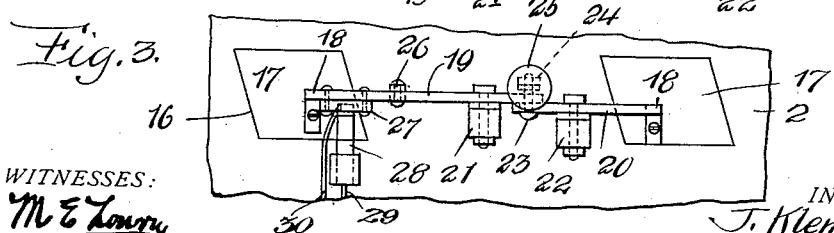
WITNESSES:
M. E. Lowry
K. H. Butler
INVENTOR.
J. Klemovics.
BY
ATTORNEYS
COLUMBIA PLANOGRAPH CO., WASHINGTON, D. C.

UNITED STATES PATENT OFFICE.

JANOS KLEMOVICS, OF HOMESTEAD, PENNSYLVANIA, ASSIGNOR OF ONE-FOURTH TO JOZSEF PENTEK, ONE-FOURTH TO BERTALAN KUN, AND ONE-FOURTH TO BERTALAN KOJSZA, ALL OF HOMESTEAD, PENNSYLVANIA.

ELECTRIC TRAP.

1,017,875. Specification of Letters Patent. Patented Feb. 20, 1912.

Application filed March 30, 1911. Serial No. 617,878.

*To all whom it may concern:*

Be it known that I, JANOS KLEMOVICS, a subject of the King of Hungary, residing at Homestead, in the county of Allegheny and State of Pennsylvania, have invented certain new and useful Improvements in Electric Traps, of which the following is a specification, reference being had therein to the accompanying drawing.

This invention relates to electric traps, and the objects of my invention are to provide a trap that can be advantageously used for catching rats and other rodents, and to employ an electric current for exterminating rats or other rodents entering the trap.

Further objects of my invention are to provide a trap with a revoluble conveyer that will shift a rat from one part of the trap to another part, whereby the rat will be discharged into the pit or well, and to provide an electric trap that can be safely used, easily installed in connection with an ordinary lighting circuit and manufactured at a comparatively small cost.

With these and such other objects in view as may hereinafter appear, the invention resides in the novel construction, combination and arrangement of parts to be hereinafter specifically described and then claimed.

Reference will now be had to the drawing, wherein like numerals of reference designate corresponding parts throughout the several views, in which:—

Figure 1 is a horizontal sectional view of the trap, Fig. 2 is a vertical cross sectional view of the same, and Fig. 3 is a bottom plan of a portion of the trap.

The reference numeral 1 denotes a pit, well or receptacle and mounted over the receptacle is the circular bottom plate 2 of a circular trap or casing 3, the top of the trap being closed by a circular plate 4 having a central opening 5. The bottom plate 2 has a central bearing 6 for the depending armature shaft 7 of an electric motor 8 mounted upon the top plate 4, said shaft extending through the opening 5. The motor 8 is of an ordinary and well known type and is secured to the top plate 4 by bolts 9 and nuts 10. This motor is inclosed by a hood or casing 11 mounted upon the top plate 4.

12 denotes a hub carried by the armature shaft 7 within the trap 3 and mounted in said hub are a plurality of radially disposed blades 13 having the outer ends thereof extending into proximity to the inner walls of the trap, said hub and said blades constituting a rotary conveyer. The blades 13 are adapted to divide the trap into a plurality of compartments, and the walls of the trap, at diametrically opposed points are provided with openings 14 in communication with the compartments 15 of the trap.

The bottom plate 2 at the compartments 15 is provided with openings 16 and arranged in these openings are movable platforms 17. These platforms are supported by the outer ends 18 of levers 19 and 20 pivotally supported by depending bearings 21 and 22, carried by the bottom plate 2. The inner ends of the levers are slotted and pivotally connected together by a bolt 23 and a nut 24, said bolt supporting a depending weight 25 adapted to normally maintain the platforms 17 in an elevated position with the upper surfaces thereof in a plane with the top of the bottom plate 2. The lever 19 is provided with a vertical arm 26 adapted to contact with the hub 12 and limit the elevating movement of said platforms. The lever 19 is provided with a contact block 27 adapted to engage a contact arm 28 supported by the bottom plate 2. The contact arm 28 is connected by a wire 29 to the motor 8 and the contact block 27 is connected by a wire 30 to a suitable source of electrical energy. Another wire 31 from the same source of electrical energy is connected to the motor 8. The contact block 27 and the contact arm 28 serve functionally as a switch adapted to be closed by a lowering movement of the platforms and opened by an elevating movement of said platforms.

The other compartments of the trap are designated 32 and arranged upon the bottom plate 2 within these compartments are contact bars 33 and 34, the former being connected to curved bars 35, carried by a bar 36 extending from one compartment to the other. The latter are mounted upon plates 37 carried by a bar 38 extending from one compartment to the other. The bars 33 and 34 are arranged in parallelism and suitably spaced apart or insulated from one another. The bars 33 are connected by a wire 39 to the wire 31, and the bars 34 by a wire 40 to the wire 30.

41 denotes bait holders carried by the hub 12 and provided with bait 42, the bait 42 being arranged above the platforms 17.

43 denotes openings in the bottom plate 2 within the other compartments 44 of the trap.

The hub 12 is provided with two diametrically opposed notches 26ª.

When the rat enters the opening 14 to obtain the bait 42, the rat treads upon a movable platform 17, thereby depressing it and closing the motor circuit. When the motor circuit is closed, the hub 12 is operated, carrying the rotary conveyer therewith, the closing of the motor circuit will be maintained until the hub 12 has rotated a sufficient distance to bring the opposite notch into register with the pin 26, and thus allow the weight 25 to restore the platform, and hence the contacts, to normal position. At each actuation of the trap the conveyer is moved through a semi-revolution and carries the rat into one of the compartments 32 where the rat is electrocuted by contacting with the bars 33 and 34, and after it is electrocuted it is precipitated through the opening 43 into the pit or well 1, from which the rat can be removed by shifting the trap from over the pit or well.

What I claim is:—

1. In an electric trap, a casing adapted to be mounted over a pit or receptacle and having the vertical wall thereof provided with openings, a rotary conveyer arranged in said casing and dividing it into a plurality of compartments, an electric motor arranged upon said casing for revolving said conveyer, the bottom of said casing having openings communicating with two of said compartments and said pit, contact bars arranged in the other of said compartments and in circuit with a source of electrical energy, and movable platforms arranged in two of said compartments and capable when actuated by the weight of a rodent to complete a circuit through said motor, thereby operating the conveyer and sweeping the rodent from off a platform on to said bars to be electrocuted.

2. In an electric trap, a casing having the vertical wall thereof provided with openings, a rotary conveyer dividing said casing into a plurality of compartments, said openings providing the entrance for said compartments, an electric motor mounted upon the casing for revolving said conveyer, contact bars arranged in certain of the compartments of said casing and in circuit with a source of electrical energy, and movable platforms arranged in the other of the compartments of said casing and capable when depressed of completing a circuit for operating the motor.

3. In an electric trap the combination with a pit or receptacle, of a casing mounted upon said receptacle and communicating therewith and provided with openings, a rotary conveyer arranged in said casing and dividing it into a plurality of compartments, said openings constituting entrances for said compartments, an electric motor arranged upon said casing for revolving said conveyer, contact bars arranged in certain of said compartments and in circuit with a source of electrical energy, depressible platforms arranged in the other of said compartments and capable when depressed to complete the motor circuit thereby revolving said conveyer, and a lever mechanism supported from the bottom of said casing and connected with said platform for normally maintaining them in an elevated position.

In testimony whereof I affix my signature in the presence of two witnesses.

JANOS KLEMOVICS.

Witnesses:
 Joseph Deutser,
 Max H. Srolovitz.